United States Patent Office 2,848,041
Patented Aug. 19, 1958

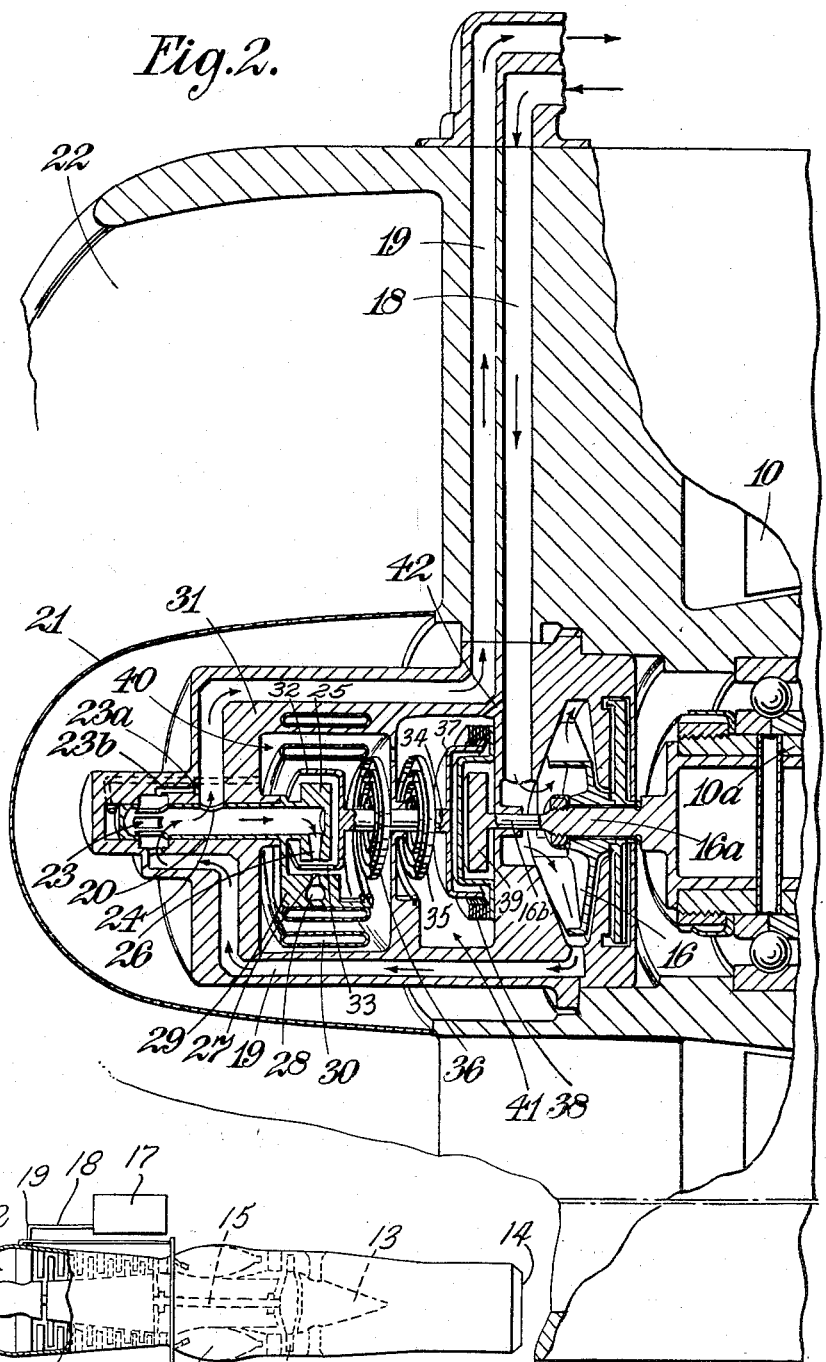
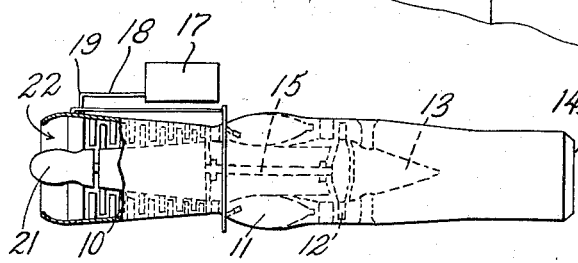
Fig. 1.
Fig. 2.
INVENTORS
J. S. HOLLINGS &
D. O. DAVIES

2,848,041

GAS TURBINE ENGINE FUEL SYSTEM INCLUDING A FUEL CONTROL MECHANISM

John Shaw Hollings, Chellaston, England, and David Omri Davies, Ammanford, Wales, assignors to Rolls-Royce Limited, Derby, England, a British company Application August 15, 1952, Serial No. 304,591

Claims priority, application Great Britain August 28, 1951

2 Claims. (Cl. 158—36.4)

This invention relates to control mechanisms of the kind (hereinafter referred to as the kind specified) comprising a nozzle which is fed with a pressure fluid to form a jet, a receiving chamber having an inlet to the chamber arranged in the path of the jet so that there is produced in the chamber a control pressure dependent on the kinetic energy of the jet fluid entering the chamber through the inlet, and an obturator arranged to extend in the path of the jet between the nozzle and inlet to limit the flow of jet fluid into the inlet, it being arranged that the extent to which the obturator obstructs the flow is varied in accordance with a control variable thereby to produce a corresponding change in the control pressure, and a controlled element arranged to be adjusted by the control pressure.

According to the present invention, the obturator and a unit which has the nozzle and receiving chamber are arranged for separate movements in a sense to vary the jet obstruction by the obturator, the one movement being effected as a function of the control variable to produce a change in the control pressure, and the other movement being effected through pressure-sensitive means by the said change in the control pressure and being in the same sense as the said one movement. Preferably, it is arranged that the obturator is moved as a function of the control variable and the unit having the nozzle and receiving chamber moves under the control of the control pressure. Preferably, moreover, the obturator and the unit having the nozzle and receiving chamber are arranged for angular movement about a common axis.

The arrangement of the invention in effect provides a follow-up by the said other movement of the said one movement whereby the control mechanism can be made sensitive by arranging that a small relative movement of the obturator and the unit having the nozzle and receiving chamber gives rise to a large change in the control pressure.

According to an important feature of this invention, the pressure-sensitive means may be a Bourdon tube device arranged co-axial with the obturator and the unit forming the nozzle and receiving chamber and connected to respond to changes in the control pressure, and the part to be moved by the control pressure may be coupled to the free end of the Bourdon tube.

According to yet another feature of this invention, the pressure-sensitive means may be arranged also directly to effect the movement of the controlled element. In one preferred arrangement embodying this feature of the invention the controlled element is arranged for angular movement coaxially with the obturator and the unit having the nozzle and receiving chamber is coupled directly to or made in one piece with the part moved by the control pressure. The control mechanism can be arranged to act as a governor by arranging the controlled element to cause a change of the control variable opposite to that causing adjustment of the controlled element.

In one important application of control mechanism according to this invention, the control mechanism is arranged to control the supply of liquid fuel to an engine in accordance with an engine operating variable, for example engine rotational speed or atmospheric pressure, and in one preferred arrangement the control mechanism is arranged to act as a top speed governor by causing the controlled element to act as a throttle to cut down the fuel supply on actuation of the control mechanism on increase of engine speed and to increase the fuel supply on decrease of engine speed and by employing pressure fuel from an engine driven pump as the jet fluid.

An embodiment of control mechanism of this invention will now be described as applied to controlling the fuel supply to an aircraft gas-turbine, to prevent overspeeding or underspeeding of the engine. The description refers to the accompanying drawings in which:

Figure 1 is a diagrammatic illustration of one form of such engine, and

Figure 2 illustrates one arrangement of control mechanism suitable for use with the engine of Figure 1.

Referring to Figure 1 the engine is of generally well-known form and comprises a compressor 10, combustion equipment 11 in which fuel is burnt with air delivered to it from the compressor 10, a turbine 12 connected to be supplied with hot operating gas from the combustion equipment 11 and arranged to drive the compressor 10 through shaft 15 and an exhaust unit 13 by which the hot exhaust gases from the turbine 12 are conveyed to a propelling nozzle 14 through which the exhaust gases pass to atmosphere as a propulsive jet.

The fuel system for supplying fuel to the combustion equipment 11 comprises (Figure 2) a centrifugal pump 16 which draws in fuel through conduit 18 from a tank 17 and delivers the fuel through a conduit 19 past a throttle valve 20 to the combustion equipment 11. The pump 16 and throttle valve 20 are conveniently arranged for rotation about the axis of the compressor 10 and turbine of the engine and accommodated in a nacelle 21 disposed centrally of the air intake 22 of the engine. The pump 16 is conveniently driven from the engine by having its shaft 16a coupled to the compressor shaft 10a.

The throttle valve 20 comprises a hollow cylindrical plug with closed ends and having in its length a set of inlet ports 23 the effective area of which are unchanged by rotation of the plug, and a metering outlet port 24, the effective area of the metering outlet port 24 being variable by rotation of the plug about its axis. A minimum flow port 23a connected by the passage-way 23b to the chamber surrounding the inlet ports 23 is provided in the conduit 19 just downstream of the metering outlet port 24.

The throttle valve 20 is controlled to act to prevent over-speeding of the engine by the following control mechanism.

One end of the plug is formed with an enlarged cylindrical head 25 (coaxial with the stem of the plug) and the head is formed with a radially outwardly-directed-convergent nozzle 26, the inner (and larger) end of which is fed with fuel from inside the plug at the fuel pressure upstream of the metering outlet port 24 and the outer end of which is directed towards inlet 27 of a receiving chamber 28. The receiving chamber 28 is formed in a flange part 29 of the throttle plug valve and is radially spaced from the nozzle 26 and the inlet 27 is an outwardly divergent passage which communicates at its downstream end with the interior of a helical Bourdon tube 30 at its free and inner end, the outer end of the Bourdon tube being secured to fixed structure 31. The Bourdon tube 30 is arranged, by its expansions and contractions to rotate the throttle valve 20.

A steel cup 32 has a skirt arranged to encircle the head 25 of the plug to extend axially between the head 25 and the flange part 29 formed with the receiving chamber 28. The skirt of the steel cup 32 has in it an axial slot 33 and the steel cup is mounted coaxially with the throttle valve 20 and is arranged to be rotatable to vary the extent to which the slot 33 in the skirt lies between the nozzle 26 and the inlet 27 to the receiving chamber 28 and thus to act as an obturator to vary the pressure in the receiving chamber 28 (and Bourdon tube 30) due to the kinetic energy of the portion of the fuel jet from the nozzle 26, which reaches the receiving chamber 28.

The steel cup 32 has extending axially from its base a spindle 34 by which the cup is mounted for rotation and the spindle 34 is spring-loaded by a pair of spiral springs 35, 36, the inner ends of both of which are secured to the spindle 34. The outer end of the spiral spring 35 is secured to stationary structure and the outer end of the spiral spring 36 is secured to the flange part 29 of the throttle valve. The spiral springs 35, 36 are both arranged so that their coils grow in the same direction as those of the Bourdon tube 30, and so that the restraint placed by them on the spindle 34 opposes a drag which is dependent on engine speed.

This drag is conveniently applied magnetically in the following manner. The end of the spindle 34 remote from the steel cup 32 carries a co-axial and oppositely-facing bronze cup 37, the skirt of which extends axially within a circular soft iron stator 38 and encircles a rotating magnet 39 which is carried on a spindle extension 16b of the fuel pump impeller. Clearly on rotation of the magnet 39, a drag is placed on the bronze cup 37 which is dependent on the engine rotational speed and which is opposed by the spiral springs 35, 36.

The enlarged cylindrical head 25 and flange part 29 of the throttle 20, the Bourdon tube 30 and the spiral spring 36 are accommodated in a chamber 40 which communicates with the fuel pump inlet conduit 18 through a second chamber 41 which houses the second spiral spring 35, bronze cup 37 and soft iron stator 38 and through a port 42 in the wall of chamber 41.

In operation of the control mechanism, if the engine overspeeds for any cause, the torque on the bronze cup 37 increases thus rotating the spindle 34 and steel cup 32 against the action of the spiral springs 35, 36 and moving the operative edge of the slot 33 in the steel cup to reduce the kinetic pressure effect of the jet from the nozzle 26 in the receiving chamber 28. The Bourdon tube 30 thus tends to coil up and the throttle valve 20 is rotated to close off port 24 and to cut down the fuel supply thus reducing the engine speed and drag on the bronze cup 37. As the throttle valve 20 is rotated, the enlarged cylindrical head 25 and flange part 29 rotate together as a unit and the rotation is in the same direction as that of the steel cup 32, so that in effect the nozzle 26 and receiving chamber 28 follow-up movements of the edge of the slot 33 and the mechanism can be made sensitive by arranging that a small displacement of the edge of the slot 33 relative to the nozzle 26 and receiving chamber 28 members causes a large change in the kinetic pressure effect of the jet.

The mechanism is arranged to maintain a governed speed within a limited range determined by the load of the spiral spring 36 and its rate. Therefore on acceleration, at a pre-determined speed below the final governed speed, the magnetic drag on the cup 37 will overcome the torsion applied by the spring 36 causing rotary movement of the steel cup 32 thus blanking off the jet from the nozzle 26. The throttle will close to an extent arresting the acceleration and finally settle at an extent of closure defining a fuel flow appropriate for the final governed speed. It will be appreciated that with a gas turbine engine the ambient atmospheric conditions may vary the fuel flow appropriate for the final governed speed over a wide range, for example over a range corresponding to the fuel consumption at ground level as compared with that at high altitude. Thus with increase of altitude the throttle will progressively close in order to maintain a governed speed within the range and it will be clear that over the range of angular movement in which the nozzle and receiving chamber follow up the movement of the interruptor cup, the operative edge of the slot will progressively move across the jet; that is the movement of the interruptor cup is fractionally greater than that of the nozzle and receiving chamber members.

The mechanism is preferably arranged such that a defined pressure drop as between the pressure potential of the jet and that of the receiving chamber must exist before the throttle begins to close the port 24, e. g. at the point when on acceleration the throttle begins to close the port 24 the interruptor cup may blank off a quarter of the jet. Additionally when the throttle valve in acceleration fully closes the port 24 the interruptor cup may blank off only three-quarters of the jet, leaving a residual pressure within the receiving chamber. Further movement of the cup will thus cause movement of the throttle valve beyond the fully closed position of port 24.

In this manner the maximum pressure which may exist in the Bourdon tube may be arranged to be substantially greater than the pressure in the Bourdon tube with the throttle valve just fully open, whilst the pressure in the Bourdon tube when the throttle valve is just fully closed may be arranged to be substantially greater than zero. This arrangement ensures positive operation of the valve throughout its range of movement despite frictional resistance.

As an alternative it may be arranged that the edge of the slot 33 is arranged to move out of a position in which it obturates the jet from the nozzle 26 with an increase in engine speed; thus an increase in engine speed will cause an increase in pressure in the Bourdon tube 30, the direction of growth of the tube 30 being reversed so that such increase in pressure causes closure of the throttle 20.

We claim:

1. A gas-turbine engine including combustion equipment and a fuel system including a fuel pump for supplying fuel through a conduit to said combustion equipment and having a rotor of which the rotational speed increases on increase of the supply of fuel, and a control mechanism comprising a fixed structure, a rotatable unit mounted for rotation in said fixed structure and having formed therein a radially-extending nozzle and a receiving chamber having a tubular inlet aligned with said nozzle and spaced from said nozzle by an annularly-extending space, means to supply pressure fluid to said nozzle thereby to produce a jet of fluid therefrom towards said receiving chamber, a rotatable annularly-extending obturator adapted to extend into the annularly-extending space between said nozzle and said inlet and mounted for rotational movement in said fixed structure relative to said unit between a position in which it substantially interrupts said jet and a position in which it affords no substantial interruption to said jet, whereby the pressure in the receiving chamber depends on the relative positions of said unit and said obturator, a Bourdon tube connected at one end to said unit to have its interior in communication with said receiving chamber and anchored at its other end to said fixed structure and adapted on variation of the pressure in the receiving chamber due to movement of said obturator to cause a movement in the same sense of said unit, magnetic drag clutch means comprising a part mounted coaxially with said rotor and connected to said rotor to rotate therewith and a second part connected to said obturator to rotate it whereby a drag is placed on said second part which is dependent on the rotational speed of the engine rotor, resilient means connected to said second part to oppose said drag, whereby the extent of rotation of said obturator is dependent on the rotational speed of the rotor, and a controlled element including a throttle valve in said fuel supply conduit and connected to said unit for movement relative to said fixed structure to cut down the fuel supply on actuation of the control mechanism due to increase of speed of the engine rotor and to increase the fuel supply on decrease of speed of the engine rotor.

2. A gas-turbine engine as claimed in claim 1, wherein said means to supply pressure fluid to said nozzle includes a conduit between the delivery of said fuel pump and said nozzle.

References Cited in the file of this patent

UNITED STATES PATENTS

| | | |
|---|---|---|
| 722,443 | Birkholy | Mar. 10, 1903 |
| 2,056,259 | Cummins | Oct. 6, 1936 |
| 2,567,500 | Watson et al. | Sept. 11, 1951 |
| 2,621,630 | Ifield | Dec. 16, 1952 |
| 2,655,316 | Edwards | Oct. 13, 1953 |
| 2,661,796 | Davies et al. | Dec. 8, 1953 |

FOREIGN PATENTS

| | | |
|---|---|---|
| 500,864 | Germany | June 27, 1930 |
| 372,258 | Great Britain | May 5, 1932 |
| 526,101 | Great Britain | Sept. 11, 1940 |